Dec. 25, 1923.
W. R. HASTEDT
SHOCK ABSORBER
Filed Dec. 21, 1922
1,478,711
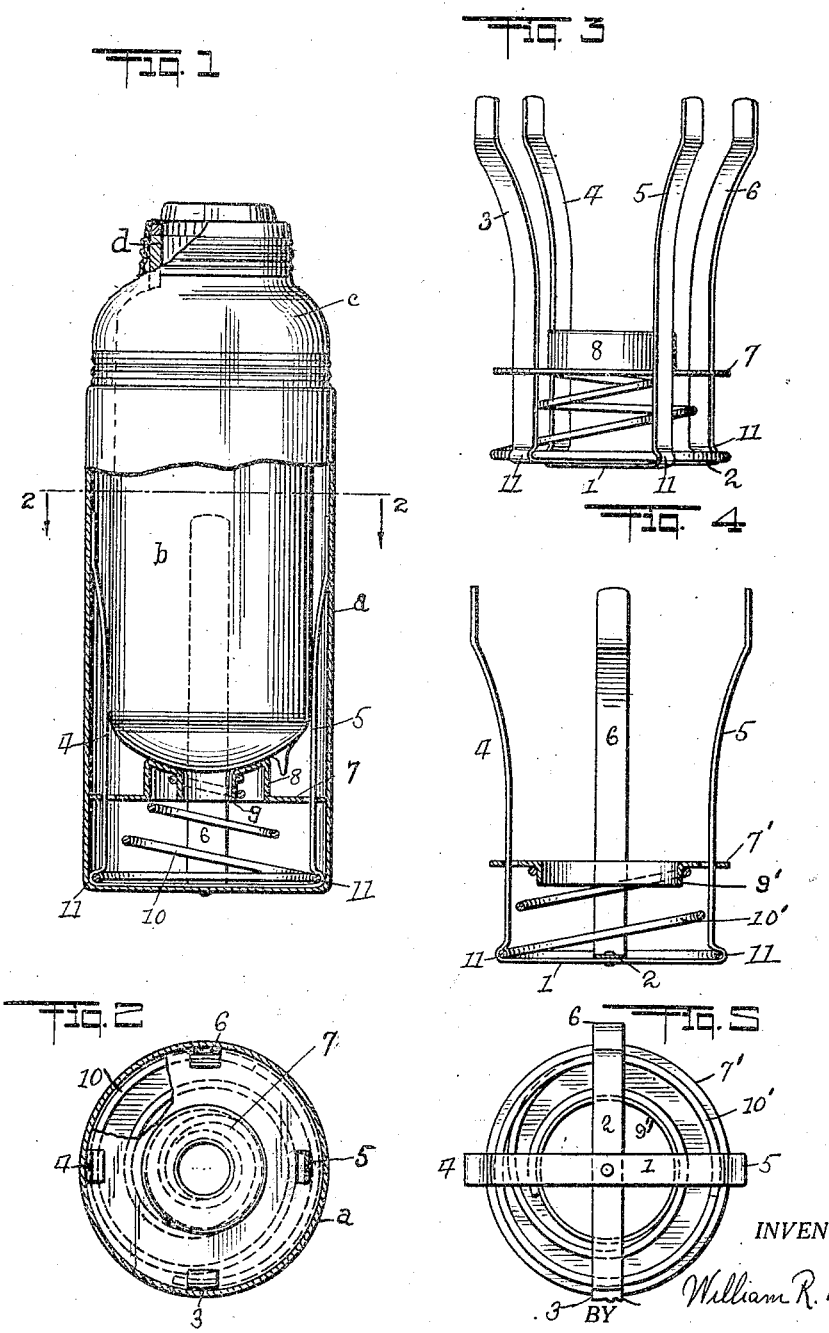

Patented Dec. 25, 1923.

1,478,711

UNITED STATES PATENT OFFICE.

WILLIAM R. HASTEDT, OF NORWICH, CONNECTICUT, ASSIGNOR TO AMERICAN THERMOS BOTTLE COMPANY, OF NORWICH, CONNECTICUT, A CORPORATION OF MAINE.

SHOCK ABSORBER.

Application filed December 21, 1922. Serial No. 608,202.

*To all whom it may concern:*

Be it known that I, WILLIAM R. HASTEDT, a citizen of the United States, residing at Norwich, in the county of New London and State of Connecticut, have invented certain new and useful Improvements in Shock Absorbers, of which the following is a specification:

My invention relates to improvements in shock absorbers such as are used in supporting glass vacuum vessels within rigid outer cases in such manner that the glass vessels are protected from shocks and jars which would otherwise damage them. It is my object to produce a shock absorber which will protect the glass vessel from side shocks as well as bottom shocks, which will support vessels which may vary in size from the standard, which will exert a firm, but gentle, upward pressure on the vessel to properly seal the joint between the glass and metal case and which will not produce a side thrust on the vessel being supported and which will be made of non-absorbent material.

In the drawing Fig. 1 is a view, partly in section, of my improved shock absorber in a case; Fig. 2 a sectional view of the structure of Fig 1 on the line 2—2 thereof; Fig. 3 a view of the shock absorber shown in Fig. 1; Fig. 4 a view, partly in section, of a modified form of shock absorber; and Fig. 5 a bottom view of the shock absorber of Fig. 4.

The drawing illustrates the preferred form of my invention but I do not limit myself to the precise construction shown and described herein as the mechanical details may be greatly varied without departing from my invention.

The shock absorber shown in the drawings comprises a base formed by crossing two strips of flexible metal 1 and 2 and securing them together at their crossing. The strips are continued upwardly to form upwardly extending flexible members 3, 4 5 and 6, flaring outwardly at their upper halves but finally bent slightly inwardly at their extreme ends as shown in Figs. 3 and 4.

A support 7 slidingly engages the upwardly extending flexible members 3, 4, 5 and 6, the flexible members passing through slots near the periphery of the support. In the form shown in Figs. 1, 2 and 3 the support 7 has a centrally apertured boss 8 and a downwardly extending flange 9. A resilient member in the form of a coil spring 10 engages the base, the junction 11 of the base and upwardly extending flexible members being curved to receive the bottom coil of the spring 10, the upper coil engaging the flange 9 on the support 7.

In the form shown in Figs. 4 and 5 the boss is omitted from the support 7' but the central aperture has the downwardly extending flange 9' to engage the upper coil of the spring 10'.

The support is slightly less in diameter than the inside of the rigid outer case and the flared ends of the upwardly extending flexible members 3, 4, 5 and 6 extend outwardly so that when the shock absorber is in the case the tops of the flexible members will be thrown inwardly and their middle portions will be bowed inwardly clear of the case walls with the bent tip ends practically flat on the case wall. In this way the side wall of the glass vacuum vessel is yieldingly supported by the bows in the flexible members which flatten more or less as the diameter of the vessel may vary.

In use the shock absorber is dropped into a case *a* and the glass vacuum vessel *b* is set down on the support. The case top *c* is then secured to the case *a*, pushing the vessel downwardly and compressing the spring. This compression of the spring in turn reacts to push the neck of the vessel into a firm contact with the gaskets *d* in the neck of the case top *c* to effect a tight joint preventing the entrance of moisture into the case *a*.

The flexible members 3, 4, 5 and 6 are interposed between the side wall of the glass vacuum vessel and the metal outer case so that the glass vessel is yieldingly supported on the sides and bottom and shocks are not transmitted to the glass but are absorbed before they reach it.

As the shock absorber is preferably made entirely of metal it cannot absorb moisture and become unsanitary in the event moisture finds its way into the case.

If the glass vessels vary from the standard in size the bottom spring is compressed more or less and the flexible side members are flattened more or less so that the glass vacuum vessel is as firmly supported as if it were of standard size.

I claim:—

1. A shock absorber comprising a base, a plurality of upwardly extending flexible members, a rigid support slidable on the flexible members and a resilient member interposed between the base and slidable support.

2. A shock absorber comprising a base, a plurality of upwardly extending flexible members, a rigid support peripherally slotted, the upwardly extending members passing through the slots in the support and a resilient member between the base and support.

3. A shock absorber comprising two crossed strips of flexible material forming a base and extending upwardly and flared outwardly at their upper parts, a rigid support slidable on the upward extensions and a spring between the base and support.

4. A shock absorber comprising two crossed strips of flexible material forming a base and extending upwardly and flared outwardly at their upper parts, a centrally apertured rigid support slidable on the upward extensions, a downwardly extending flange thereon, a coil spring, the bottom coil of which engages the base and the upper coil of which engages the support flange.

5. A shock absorber comprising two crossed strips of flexible material forming a base and extending upwardly and flared outwardly at their upper parts, a support slidable on the upward extensions, a raised, centrally apertured boss on the rigid support and a downwardly extending flange from the aperture, and a coil spring the lower coil of which engages the base and the upper coil of which engages the support flange.

6. A shock absorber comprising two crossed strips of flexible material forming a base and extending upwardly and flared outwardly at their upper parts, the junction between the base and upward extensions being curved, a centrally apertured rigid support slidable on the upward extensions, a downwardly extending flange thereon, and a coil spring between the base and support the lower coil of which engages the curved junctions and the upper coil of which engages the support flange.

7. A shock absorber for vacuum vessels comprising flexible side members adapted to lie between a vacuum vessel proper and a rigid outer case, a bottom support movable vertically with respect to the side members and a resilient member interposed between the bottom support and a case bottom.

In testimony whereof I have affixed my signature.

WILLIAM R. HASTEDT.